United States Patent [19]

Niessen et al.

[11] Patent Number: 4,659,283

[45] Date of Patent: Apr. 21, 1987

[54] PROPELLER SYNCHROPHASER ® DEVICE AND MODE LOGIC

[75] Inventors: Frank R. Niessen, Stafford Springs; Roy W. Schneider, Ellington, both of Conn.

[73] Assignee: United Technologies Corporation, Hartford, Conn.

[21] Appl. No.: 781,586

[22] Filed: Sep. 30, 1985

[51] Int. Cl.⁴ .............................................. B64C 11/50
[52] U.S. Cl. ........................................ 416/34; 416/35
[58] Field of Search ............................. 416/34, 33, 35

[56] References Cited

U.S. PATENT DOCUMENTS

| | | | |
|---|---|---|---|
| 2,847,617 | 8/1958 | Clark | 416/34 X |
| 2,877,854 | 3/1959 | Brahm | 416/34 |
| 2,878,426 | 3/1959 | Preli et al. | 416/34 X |
| 2,887,621 | 5/1959 | Wilde | 416/34 X |
| 2,979,135 | 4/1961 | McDonald et al. | 416/35 |
| 2,986,223 | 5/1961 | McDonald | 416/35 |
| 3,007,529 | 11/1961 | Brockert et al. | 416/34 |
| 3,079,531 | 2/1963 | Tugwood | 416/34 X |
| 3,479,822 | 11/1969 | Nelson et al. | 416/30 X |
| 3,689,175 | 9/1972 | Hartzell et al. | 416/34 |
| 4,245,955 | 1/1981 | Lambertson | 416/34 |

Primary Examiner—Everette A. Powell, Jr.
Attorney, Agent, or Firm—Francis J. Maguire, Jr.

[57] ABSTRACT

An improved slave propeller SYNCHROPHASER ® device and mode logic for a multi-propeller aircraft is disclosed. A designated master propeller has at least one associated slave propeller which has its speed and phase controlled with respect to the master by initially controlling the speed of the slave propeller to within a selected constant number of RPM of the master so that the master and slave propellers are periodically in phase and then switching to phase control for controlling the speed of the slave propeller in the presence of a phase difference signal having an absolute magnitude less than a selected absolute magnitude. A selected phase difference relationship between the master and the slave may thus be effected with minimum transient effect on the speed of the slave propeller.

5 Claims, 12 Drawing Figures

1

PROPELLER SYNCHROPHASER ® DEVICE AND MODE LOGIC

DESCRIPTION

1. Technical Field

The present invention relates to multiple propeller driven aircraft, and particularly to a SYNCHROPHASER ® device for controlling a slave propeller at the same speed and phase as a master propeller.

2. Background Art

A propeller SYNCHROPHASER ® device may be used on multiengine propeller driven aircraft to maintain selected phase angle relationships between the master and each of the designated slave propellers. Once the propellers are "synchrophased" the aircraft fuselage experiences minimum acoustic noise and vibration. The propeller SYNCHROPHASER ® device maintains relative phase angle for a given slave propeller by modulating that propeller's speed. If the slave propeller speed is significantly different from that of the master when the SYNCHROPHASER ® device is first turned on by the pilot, the SYNCHROPHASER ® device may not be able to successfully control phase without inducing a significant speed transient in the slave propeller.

DISCLOSURE OF THE INVENTION

The object of the present invention is to provide a simple and effective solution to the problem of propeller SYNCHROPHASER ® device initialization speed transients.

According to the present invention, a slave propeller synchrophaser is provided having a speed control which, after pilot turn on, quickly brings the speed of the slave to a controlled constant speed difference of several RPM such that the master propeller and the slave propeller are periodically in phase and having a phase control which takes over from the speed control once both the speed difference and the phase difference fall below selected values and which controls the speed of the slave propeller to effect a chosen phase relationship between the master and the slave propeller with minimum transient effect on the speed of the slave propeller.

In further accord with the present invention, SYNCHROPHASER ® device mode logic is provided which, during the initial control period immediately following pilot turn on, monitors the absolute value of the speed error signal magnitude in order to determine when the absolute value thereof is less than a selected value and for providing a phase mode permissive signal, in the presence thereof and which is responsive to the continuing presence of the phase mode permissive signal in order to provide a switch-to-phase-mode signal indicating that the phase error signal magnitude has reached an absolute value less than a selected absolute phase difference value so that the speed control is then disabled, and the phase control means enabled, in order to bring the slave propeller into the desired phase position with respect to the master propeller. The speed error signal fed to the above described mode logic may be filtered by a first order lag circuit in order to reduce erroneous signal levels.

In still further accord with the present invention, the mode logic described above may also include means for reenabling the speed control and disabling the phase control (if enabled) in the presence of the absolute value of the speed error signal magnitude exceeding a selected magnitude after the switchover from speed to phase control mode.

In still further accord with the present invention, the phase error signal to which the mode logic is responsive may be filtered by a first order lag circuit.

Thus, when power is first applied to the SYNCHROPHASER ® device by the pilot switching the SYNCHROPHASER ® device on, the speed mode is the first mode activated. Note that the mode logic may use filtered values of speed error in order to prevent signal noise from causing undesirable mode switching. In the speed mode, the same integrator which is later used for phase control may also be used for matching speeds. The difference in speeds, which is the same as the speed error, is controlled not to zero, but to a selected value, e.g., two RPM. Since the time rate of change of phase error is proportional to speed error, this guarantees that a phase error zero crossing occurs periodically. For example, a speed error of two RPM is equal to a time rate of change of phase error of twelve degrees per second. The time rate of change of phase angle difference may thereby be selected so that the zero crossing occurs relatively frequently. When the difference in speeds is less than some selected value and the absolute value of the phase error is additionally less than a slected phase difference then the control of the SYNCHROPHASER ® device is switched from speed mode to phase mode. The value of phase error which causes the switchover from speed mode to phase mode is thus relatively small. The ensures that any transient due to a non-zero phase error will be minimized. The switchover will also occur very quickly since the frequent zero crossover of phase ensures a rapid mode switch. Additionally, if after entering into the phase mode, a large disturbance ever causes the speed error to exceed a selected RPM value, the logic switches back to speed mode again.

The invention disclosed herein is a major improvement over the prior art because it provides a quick and direct method to achieve synchrophasing. Furthermore, by eliminating all transients due to mode switching, it will enhance pilot confidence in the synchrophasing system.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
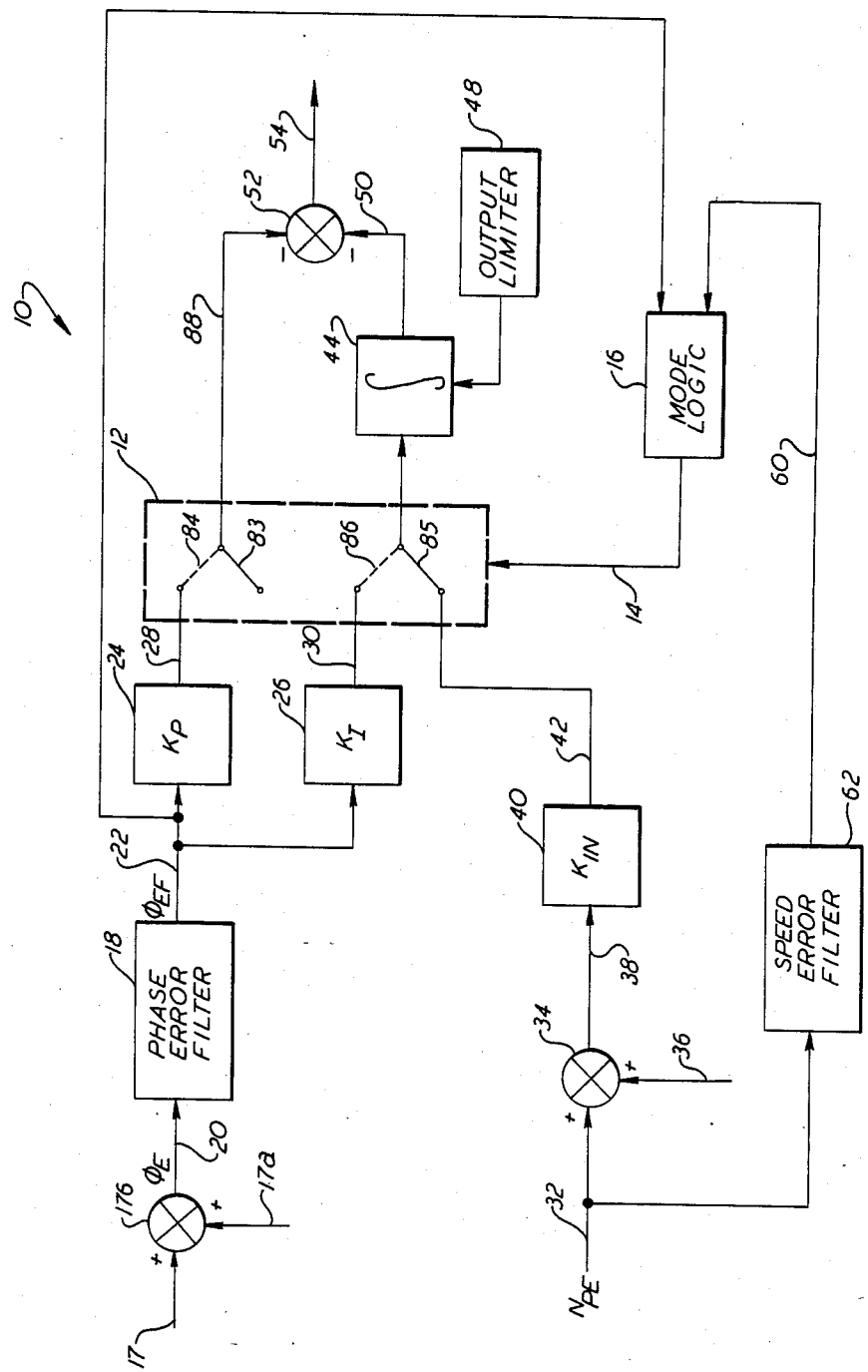
FIG. 1 is a simplified schematic block diagram illustration of a SYNCHROPHASER ® device control circuit, according to the present invention.

FIG. 1 illustrates a schematic block diagram of a SYNCHROPHASER ® device control circuit 10, according to the present invention. The SYNCHROPHASER ® device operates in one of two selectable modes according to the position of a mode switch 12 which is controlled by a mode select signal on a line 14 from SYNCHROPHASER ® device mode logic 16, also according to the present invention. A flowchart shown in FIG. 2, to be described in more detail below, illustrates the logical steps executed by the mode logic in order to determine the value of the signal on the line 14 and hence the position of the mode switch 12.

Figures 2, 3, 4:
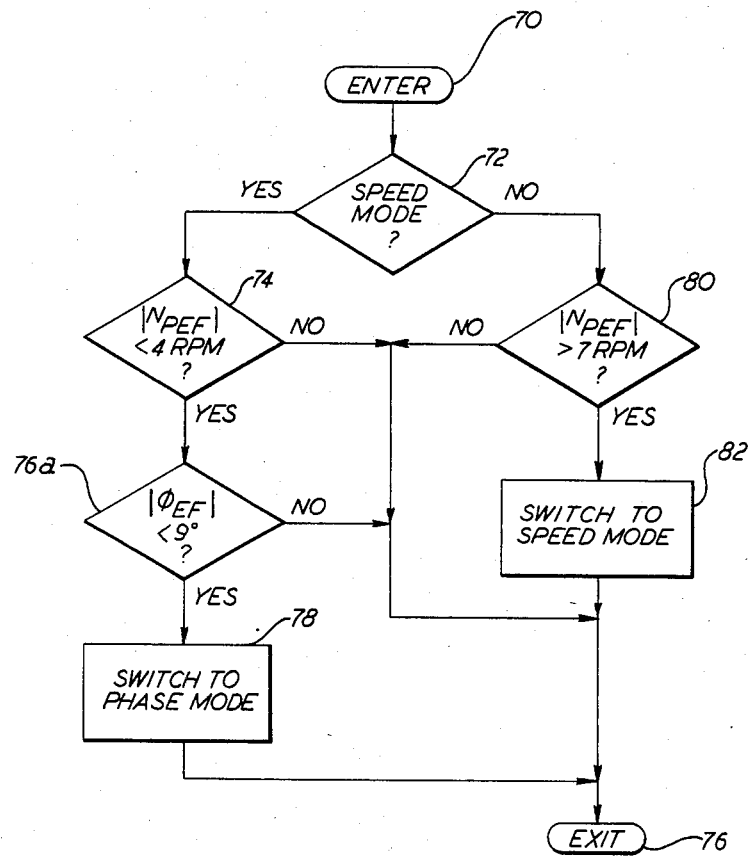
FIG. 2 is a simplified flowchart illustration of the logical steps which control the mode logic of a SYNCHROPHASER ® device, in accordance with the present invention.
FIG. 3 is a schematic block diagram illustration of a first order lag speed error filter.
FIG. 4 is a schematic block diagram illustration of a first order lag phase error filter.

Referring back of FIG. 1, the SYNCHROPHASER ® device 10 is responsive to a phase difference signal on a line 17 indicative of the sensed phase difference between a master propeller and a controlled slave propeller. The phase difference signal on the line 17 and a constant reference phase difference signal on a line 17a are summed in a summing junction 17b to provide a phase error signal on a line 20. A phase error filter 18, which may be a first order lag circuit as shown in FIG. 3, is responsive to the phase error signal on line 20. A filtered phase error signal on a line 22 is presented to a first proportional amplifier 24 and a second proportional amplifier 26 which each provide respective signals on lines 28, 30 to the mode switch 12. The mode switch is shown switched to the speed mode which it normally would be during the very beginning of the initialization immediately after the pilot turns on the SYNCHROPHASER ® device. (The SYNCHROPHASER ® device may not be able to successfully control phase unless the speed difference is relatively small, since the time rate of change of phase is proportional to the speed difference. Therefore, slave speed is controlled first).

The SYNCHROPHASER ® device 10 is also responsive to a speed error signal on a line 32 indicative of the difference between the master propeller speed and the controlled slave propeller speed. The speed error signal on the line 32 is summed in a summing junction 34 with a constant speed difference signal (e.g., a signal having a magnitude indicative of 2 RPM in one embodiment) on a line 36 which ensures that the slave propeller will be controlled to a constant speed difference between it and the master propeller. This speed difference would normally be on the order of a few RPMs and ensures that the master propeller and the slave propeller are periodically in phase so that a fairly rapid turnover from speed control to phase control can be effected. A summed signal on a line 38 is provided to a proportional amplifier 40 which amplifies the summed signal on the line 38 and provides an amplified summed signal on a line 42 to the mode switch 12. Assuming, as before, that the mode switch is initially in the speed mode, as dictated by the mode logic 16, the SYNCHROPHASER ® device 10 will thus initially control the slave propeller speed in order to bring it within a few constant sensed RPM of the master. A control integrator 44 is responsive to the amplified summed signal on the line 42 and provides an integrated control signal which is limited by a limiter 48 and which provides a limited authority integrated signal on a line 50 to a summing junction 52 which provides the synchronizer's output signal on a line 54 for biasing the slave propeller's speed reference signal.

While the SYNCHROPHASER ® device 10 is initially controlling the slave propeller's speed, in order to bring it close to the speed of the master propeller, the SYNCHROPHASER ® device mode logic 16, according to the present invention, monitors the filtered phase error signal on the line 22 and a filtered speed error signal on a line 60 in order to determine if the slave phase is close enough to the desired position and if the slave speed is close enough to the master's speed so that a sudden slave speed increase or decrease made in order to obtain the desired phase will not create a significant transient. A speed error filter 62 is responsive to the speed error signal on the line 32 and provides the filtered speed error signal on the line 60. It is illustrated in more detail in FIG. 4 where a first order lag circuit is shown. Of course, another filter type, or no filter at all could be used.

Referring now to FIG. 2, a flowchart illustration of the logical steps executed by the mode logic 16 of FIG. 1 is shown in detail. The flowchart is entered in a step 70 and a decision step 72 is next executed in which a determination is made as to whether the SYNCHROPHASER ® device 10 of FIG. 1 is in the speed mode or not. If the SYNCHROPHASER ® device is in the speed mode, a decision step 74 is next executed in which the absolute value of the filtered speed error signal on the line 60 is checked for a value less than a selected RPM, in one embodiment four RPM. If the absolute value of the filtered speed error is not less than the selected RPM value an exit is made from the flowchart in a step 76 and the logical steps are reexecuted at a later point in time. If, however, the absolute value of the filtered speed error signal is less than the selected RPM then the slave may be in a position to have its speed modulated in order to maintain the correct phase relation to the master. This is checked in a step 76a where the filtered phase error signal on the line 22 of FIG. 1 is checked to see if there is, in the embodiment shown, less than a 9° difference between the current position of the slave and the desired position. If not, an exit is made in step 76, as before. However, if the phase error is less than 9° (which of course may be, according to particular embodiments, any selected small value of phase error), then the SYNCHROPHASER ® device mode switch 12 is switched from the speed mode to the phase mode and an exit is made in step 76 and the logical steps are reexecuted a short time later.

If, after switching to phase mode, the logical steps are reexecuted, the step 72 will detect that the SYNCHROPHASER ® device is no longer in speed mode and instead of executing step 74 will execute a step 80 in which a determination is made as to whether the absolute value of the filtered speed error signal on the line 60 is greater than a selected speed error, e.g., seven RPM. If not, then an exit is made in step 76. If so, the speed difference has increased to a level at which continued phase mode control could cause undesirable transients. Therefore a switchback to speed mode is made in a step 82 so that the SYNCHROPHASER ® device can once again establish a low speed error before switching to phase mode. In this way, the mode logic 16 of FIG. 1 prevents significant speed transients.

Referring back to FIG. 1, the mode switch 12 will be assumed to be in the speed mode (as indicated by switch lines 83, 85). It will be further assumed that the mode logic has detected a speed error of less than the selected value (e.g., four RPM) and that the SYNCHROPHASER ® device still in speed mode is attempting to reduce the phase error to less than the selected value (e.g., 9°). The mode logic 16 will continue to reexecute the logical steps 70, 72, 74, 76a and 76 of FIG. 2 until the phase error is reduced below the selected value (e.g., 9°). At that point there is a switch to phase mode in step 78 and the mode switch 12 of FIG. 1 will switch to the positions shown by phantom lines 84, 86 in FIG. 1. The SYNCHROPHASER ® device will then continually provide proportional plus integral control of the phase of the slave propeller with respect to the master. A proportional signal on a line 88 will be combined with an integral signal on the line 50 which uses the same integrator 44 and limiter 48 as did the speed control circuitry. Of course, it will be understood that other circuitry and logical steps could be designed to accomplish the same functions as taught in FIGS. 1-4.

Figure 5:
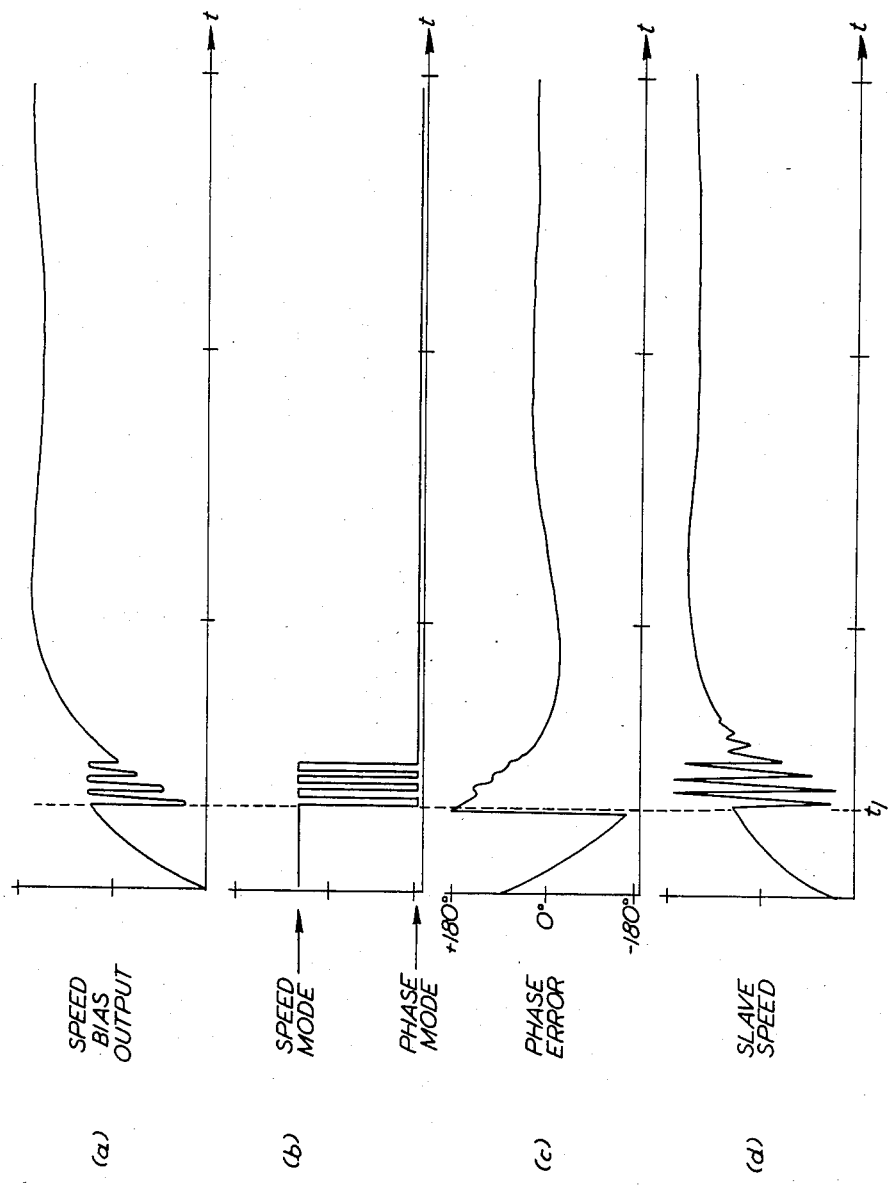
FIGS. 5a–d are illustrations of several waveforms indicative of mode cycling and speed transients experienced in the prior art.
Figure 6:
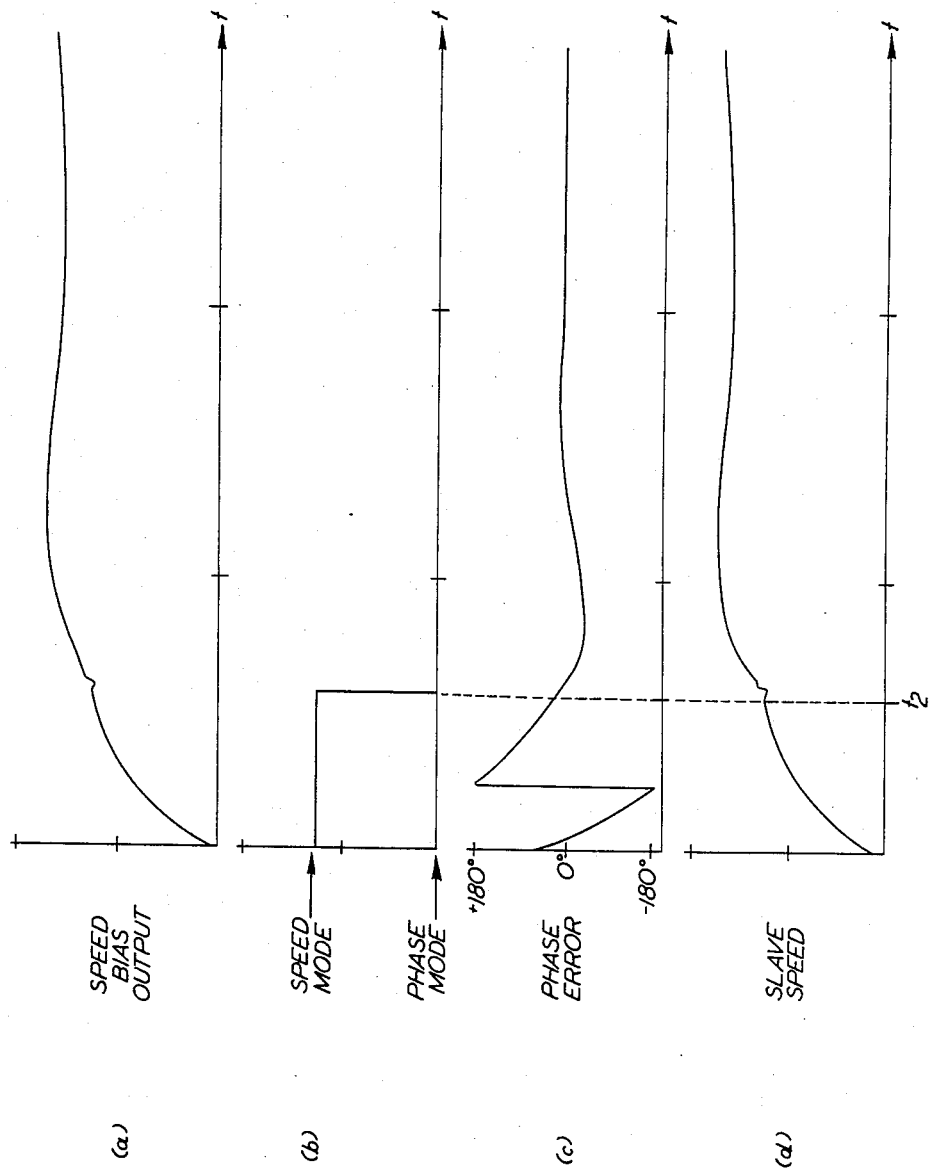
FIGS. 6a–d are illustrations similar to FIG. 5 except showing the operational improvements which occur in similar SYNCHROPHASER ® device waveforms, according to the present invention.

FIG. 5 is an illustration of several waveforms which show a particular case of undesirable mode cycling of a prior art SYNCHROPHASER ® device with accompanying slave speed changes due to the synchrophaser attempting to control the slave's speed when the phase error between the master and slave is relatively large. FIG. 5(a) shows the speed bias output signal of the prior art SYNCHROPHASER ® device undergoing rapid oscillations due to switching between speed mode and phase mode as shown in FIG. 5(b). The mode cycling of FIG. 5(b) is indicated by a high level speed mode signal and a low level phase mode signal. This is induced by the SYNCHROPHASER ® device switching to phase mode in the presence of a large positive phase error, nearly +180° in this particular case, at time $t_1$. Note that the phase error had transitioned from −180° to +180° shortly before the switch to phase mode, but this had no effect on the speed bias output since the SYNCHROPHASER ® device was in the speed mode at that time. When the switch to phase mode first occurred, at time $t_1$, the large positive phase error resulted in a sudden large decrease in speed bias output, as shown in FIG. 5(a), and also in slave speed, as shown in FIG. 5(d). The large decrease in slave speed caused the prior art SYNCHROPHASER ® device to change from phase mode back to speed mode again. This cycling between speed mode and phase mode continued until the phase error as small. This is just the sort of speed transient problem that the present invention avoids. As shown in FIG. 6, a SYNCHROPHASER ® device, according to the present invention, will evidence much smoother speed bias as shown in FIG. 6(a). The switch from speed mode to phase mode in FIG. 6(b) is not subject to mode cycling as in the similar FIG. 5(b) of the prior art. Since the mode logic of FIGS. 1 and 2 does not permit switching between speed mode and phase mode unless both the speed and phase errors are relatively low, the switch from speed mode to phase mode in FIG 6(b) only occurs at the relatively low level phase and speed error levels as shown in FIGS. 6(c) and (d) at time $t=t_2$.

It will of course be understood by those skilled in the art that the system level diagram of FIG. 1 may be implemented in hardware or software according to the particular embodiment selected.

Furthermore, although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. An improved slave propeller control device (10) for a multi-propeller aircraft having a designated master propeller and at least one associated slave propeller for controlling the speed and phase of the slave propeller with respect to the master propeller, comprising:

speed control means (34, 40, 12, 44), responsive to a slave propeller speed error signal (32) indicative of the difference in magnitude between a master sensed speed signal and a slave sensed speed signal, and responsive to a constant speed difference signal (36) indicative of a selected constant speed difference between the master propeller and the slave propeller for providing a speed bias signal (54) for controlling the slave propeller at the selected constant speed difference such that the master propeller and the slave propeller are periodically in phase; and phase control means (17b, 24, 26, 12, 44, 52), responsive after the speed error signal (32) falls below a selected absolute speed signal magnitude, to a slave propeller phase difference signal (17) indicative of the phase difference between the master propeller and the slave propeller for controlling the speed of the slave propeller in the presence of the difference in magnitude between the phase difference signal (17) and a constant reference phase difference signal (17a) as indicated by a phase error signal (20) having an absolute phase error signal magnitude less than a selected absolute phase error signal magnitude indicative of the phase error between the slave phase and a selected phase difference between the master and slave propellers being less than a selected absolute phase difference value, to provide the speed bias signal (54) to effect the selected phase difference between the master and the slave propeller with minimum transient effect on the speed of the slave propeller.

2. The control device of claim 1, further comprising:

mode logic (16) responsive to the speed error signal (32) for providing a permissive signal indicating that the absolute magnitude of the speed error signal is less than the selected absolute speed signal magnitude and that a switchover from speed mode to phase mode may be made, said mode logic also responsive to the phase error signal (20) for providing a phase mode switchover signal (14) indicating that the absolute value of the phase error signal magnitude is less than the selected absolute phase error signal magnitude and for disabling the speed control means and enabling the phase control means in the presence of the phase mode switchover signal.

3. The control device of claim 2, wherein the speed error signal (32) to which the mode logic is responsive is filtered.

4. The control device of claim 2, wherein the mode logic further comprises means responsive, after the phase control means is enabled, to the speed error signal for reenabling the speed control means and disabling the phase control means in the presence of the absolute magnitude of the speed error signal exceeding a chosen magnitude.

5. The control device of claim 1, wherein the phase difference signal (17) to which the phase control means is responsive is filtered.

* * * * *

UNITED STATES PATENT AND TRADEMARK OFFICE
CERTIFICATE OF CORRECTION

PATENT NO. : 4,659,283

DATED : April 21, 1987

INVENTOR(S) : FRANK R. NIESSEN et al

It is certified that error appears in the above-identified patent and that said Letters Patent is hereby corrected as shown below:

Column 1, line 35. After "synchrophaser" insert --SYNCHROPHASER® device--

Column 2, line 26. Cancel "slected" and substitute -- selected --

Column 2, line 31. Cancel "The" and substitute -- This --

Column 5, line 42. Cancel "as" and substitute -- was --

Signed and Sealed this

Eighth Day of September, 1987

Attest:

DONALD J. QUIGG

Attesting Officer

Commissioner of Patents and Trademarks